United States Patent
Fatehi et al.

(10) Patent No.: US 6,185,021 B1
(45) Date of Patent: Feb. 6, 2001

(54) CROSS-CONNECTING OPTICAL TRANSLATOR ARRAY

(75) Inventors: Mohammad T. Fatehi, Middletown; William Joseph Gartner, Lincroft, both of NJ (US)

(73) Assignee: Lucent Technologies, Inc., Murray Hill, NJ (US)

(*) Notice: Under 35 U.S.C. 154(b), the term of this patent shall be extended for 0 days.

(21) Appl. No.: 09/045,481

(22) Filed: Mar. 20, 1998

(51) Int. Cl.[7] .............................. H04B 10/00; H04B 14/00
(52) U.S. Cl. ........................... 359/117; 359/123; 370/387
(58) Field of Search ............................... 359/117, 123, 359/128, 139; 370/387, 370, 380

(56) References Cited

U.S. PATENT DOCUMENTS

| | | | |
|---|---|---|---|
| 4,894,818 | * 1/1990 | Fujioka et al. | 370/3 |
| 4,912,700 | * 3/1990 | Maddern | 370/58.2 |
| 5,091,905 | * 2/1992 | Amada | 370/60 |
| 5,111,323 | * 5/1992 | Tanaka et al. | 359/139 |
| 5,241,409 | * 8/1993 | Hill | 359/128 |
| 5,416,769 | * 5/1995 | Karol | 370/60 |
| 5,434,858 | * 7/1995 | Shimada | 370/68.1 |
| 5,457,556 | * 10/1995 | Shiragaki | 359/117 |
| 6,061,156 | * 5/2000 | Takeshita | 359/117 |

* cited by examiner

Primary Examiner—Jason Chan
Assistant Examiner—Agustin Bello
(74) Attorney, Agent, or Firm—Gibbons, Del Deo, Dolan, Griffinger & Vecchione

(57) ABSTRACT

A cross-connecting optical translator array that electronically switches opto-electronically converted signals received from optical transmission systems and that uses an optical transmitter to generate optical signals having the required wavelength for succeeding optical transmission systems. The cross-connecting optical translator array includes optical converters that are coupled to an input side of an electronic space switch fabric. Optical transmitters are coupled to an output side of the electronic space switch fabric. The optical transmitters are selectable to provide optical interface capability with the various wavelength optical fibers used in optical transmission systems. The combination of the optical converters and the optical transmitters operationally provide an optical translator that receive optical signals at a first wavelength and can transmit optical signals at a second wavelength. The operating speed of the array is compatible with that of the optical transmission systems. A multiple layer architecture can be used to accommodate increasingly greater optical transmission speeds by decreasing the input bit rate into multiple subrate streams and by parallel processing the resulting multiple subrate bit streams.

25 Claims, 3 Drawing Sheets

CROSS-CONNECTING OPTICAL TRANSLATOR ARRAY

FIELD OF THE INVENTION

This invention relates to the field of communication networks, and in particular, to cross-connect switches for routing optical signals.

BACKGROUND OF THE INVENTION

Communication systems use optical fibers to carry large amounts of multiplexed information over long distances from transmit terminals to receive terminals. Most long-haul transmission lines and a substantial portion of short-haul transmission lines such as inter-office and intra-office links, local area networks ("LAN") and metropolitan area networks ("MAN") are optical and therefore, the information is carried over an optical fiber.

In a communication network, it is normally essential that signals from many transmission lines be cross-connected or switched to other transmission lines to provide flexibility and to permit traffic from one transmission line to be rerouted to diverse destinations. More specifically, switching is required in a network to provide provisioning, restoration in case of line failure, network reconfiguration, maintenance, operation, service and the like.

In general, optical cross-connect switches should be used with optical communication systems so as to maintain the speed and bandwidth advantages of using optical fiber. However, a disadvantage of using optical cross-connect switches, using current technologies, is that they are not practical when the number of input and output ports is large, as is required for most telecommunications service providers or when fast reconfiguration speeds are required. For example, typical non-mechanical optical cross-connect switches are on the order of 4×4, 8×8 or 16×16, whereas the typical switch needs to generally handle much larger number of input/output ports. Although a multiple stage architecture is implementable using typical optical cross-connect switches, the number of switch stages as well as the number of optical fiber interconnects between the stages become unmanageable and impractical to implement. Moreover, the cumulative loss resulting as the optical signals pass through each stage renders the optical signals unusable and requires the use of additional optical amplifiers on each side of the switch, increasing the complexity and cost of the switch.

A further drawback of optical cross-connect switches arises when the optical transmission systems of the transmit and receive terminals and the transport medium use different wavelength standards to carry the optical signals. In order to address these incompatibility issues, multiple optical to electrical and electrical to optical signal conversions are required that add both complexity and cost to the optical communication system.

SUMMARY OF THE INVENTION

The present invention is an apparatus and method that enhances optical cross-connect capability by electronically switching opto-electronically converted signals received from optical communication systems and by using an optical transmitter to generate optical signals having the required wavelength for succeeding optical communication systems. The operating speed of the apparatus can be engineered to be compatible with optical communication systems.

In an exemplary embodiment of the present invention, a cross-connecting optical translator array includes optical-to-electrical converters that are coupled to an input side of an electronic space switch fabric. Optical transmitters are coupled to an output side of the electronic space switch fabric. The optical transmitters are selectable to provide optical interface capability with the various wavelength optical fibers used in optical communication systems. The combination of the optical-to-electrical converters and the optical transmitters permits the present invention to operate as an optical translator that receives optical signals at a first wavelength and transmits optical signals at a second wavelength, if required. As such, the present invention is particularly well suited for multiple vendor environments, where each vendor may require transmission at different wavelengths.

Advantageously, a multiple layer architecture can be used to accommodate increasingly greater optical transmission speeds by separating the input bit rate into multiple subrate streams and by switching the multiple subrate streams in parallel. The above factors make the present invention a relatively simple and cost effective apparatus and method for cross-connecting and translating optical signals between multiple optical communication systems.

BRIEF DESCRIPTION OF THE DRAWINGS

A more complete understanding of the present invention may be obtained from consideration of the following description in conjunction with the drawings in which.

DETAILED DESCRIPTION

In general, the present invention enhances optical cross-connect capability by electronically switching opto-electronically converted signals received from an optical communication system. After the electrical signal is directed to the proper output port, an optical transmitter generates an optical signal having the required wavelength for succeeding optical communication systems. As such, the present invention functionally also operates as an optical translator that receives optical signals at a first wavelength and transmits optical signals at a second wavelength, if required.

Although electronic space switch fabrics are used, the switching speeds of the present invention can be made compatible with the connected optical communication systems. A multiple layer architecture can be used to accommodate increasingly greater optical transmission speeds by decreasing the input bit rate into multiple subrate streams and by parallel processing the resulting multiple subrate streams. Moreover, the present invention provides compliant or non-compliant optical interfaces by using optical transmitters that generate the required wavelength optical signal. The present invention is usable for circuit switching optical signals between multiple optical communication systems.

Figure 1:
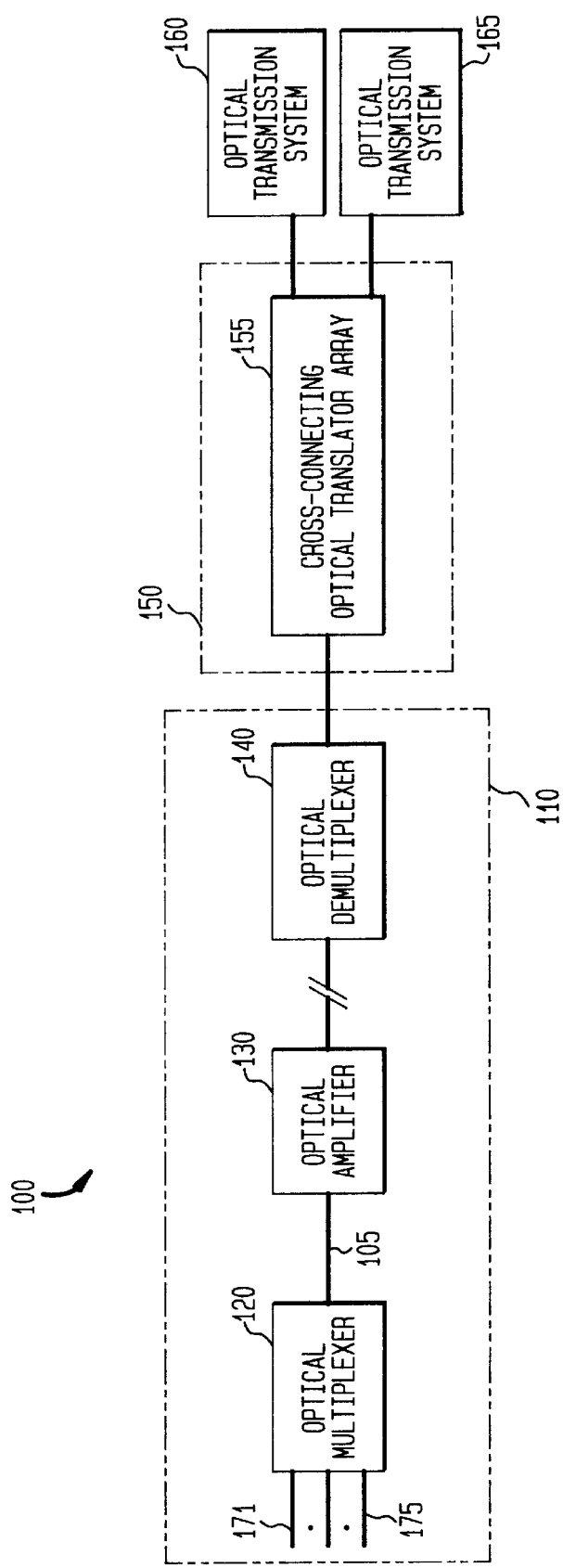
FIG. 1 is an exemplary embodiment of an optical network that uses a cross-connecting optical translator array in accordance with the present invention.

FIG. 1 illustrates an exemplary optical communication system 100 with which the present invention may be utilized. System 100 consists of an input optical communication system 110 for transmitting optical signals through an optical cross-connect translator 150, that includes a cross-connecting optical translator array 155. Optical cross-connect translator 150 directs the optical signals to optical communication systems 160 and 165. For purposes of discussion and clarity, optical communication system 110 is shown to include only an optical multiplexer 120, an optical amplifier 130 and an optical demultiplexer 140. Optical fibers 105 are used to connect the elements illustrated in FIG. 1. The operating wavelengths of optical communication systems 110, 160 and 165 can be the same or different.

Operationally, optical signals 171–175 are multiplexed by optical multiplexer 120 using for example, wavelength division multiplexing techniques. The resulting multiplexed optical signal is transported through multiple optical amplifiers 130 until reaching optical cross-connect translator 150. Prior to entering optical cross-connect translator 150, the multiplexed optical signals are demultiplexed by optical demultiplexer 140 and transmitted to corresponding input ports of optical cross-connect translator 150. The optical signals are switched and translated as required so that optical transmission systems 160 and 165 can receive and transport the output signals. Although discussed herein with reference to one direction, the other direction of transmission (and translation) operates in a similar manner.

Figure 2:
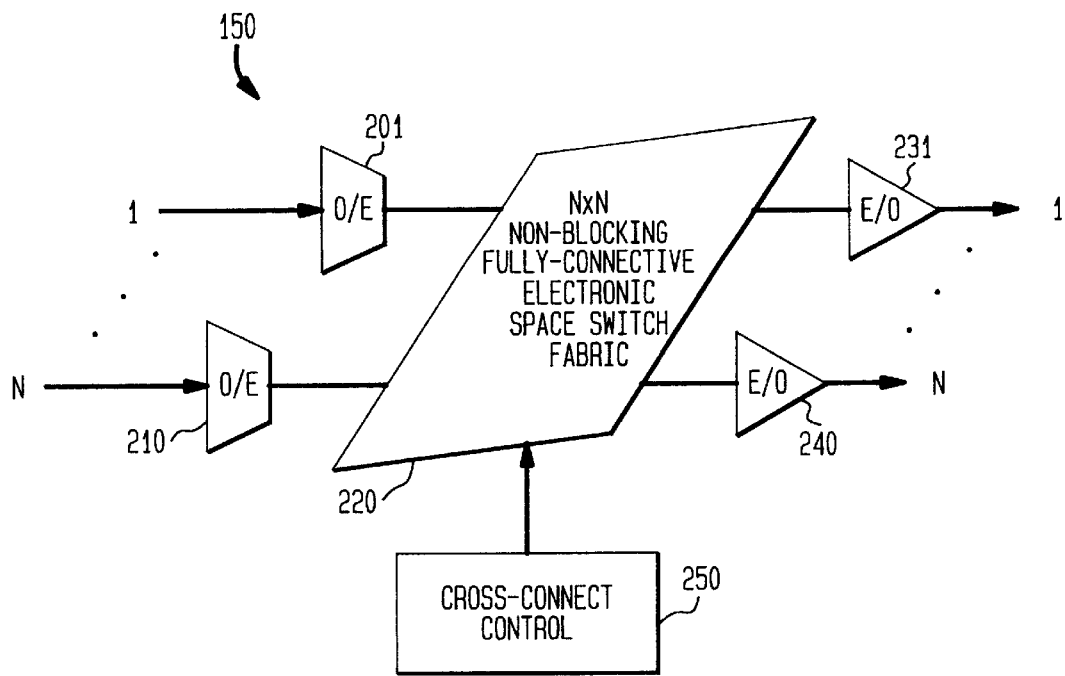
FIG. 2 is an exemplary embodiment of a cross-connecting optical translator array in accordance with the present invention.

FIG. 2 illustrates an exemplary embodiment of cross-connecting optical translator array 155, which functions operationally as optical cross-connect translator 150. Cross-connecting optical translator array 155 includes N broadband optical-to-electrical converters 201–210 that convert N optical signals to N electrical signals. Broadband devices are used so that any wavelength optical signal can be received and processed by optical translator array 155. Each of the N converters 201–210 is coupled to an input port of a N×N non-blocking, fully connective electronic space switch fabric 220, such as a 16×32 non-blocking crosspoint switch that operates at 1.25 GB/s. Alternatively, the fabric can consist of a plurality of the above switches.

A cross-connect controller 250 is used to control the mapping of the connections between the input and output ports of electronic space switch fabric 220. The output ports of electronic space switch fabric 220 are coupled to N optical transmitters 231–240. N optical transmitters are selected to generate any of the standard wavelengths, for example low cost 1.30 μm or compliant 1.5 μm transmitters can be used to generate the corresponding wavelength optical signals. Converters 201–210 and transmitters 231–240 operate as an optical translator that receives optical signals at a first wavelength and transmits optical signals at a second wavelength, if required. As such, the present invention is particularly well suited for multiple vendor environments, where each vendor may require transmission at different wavelengths.

Figure 3:
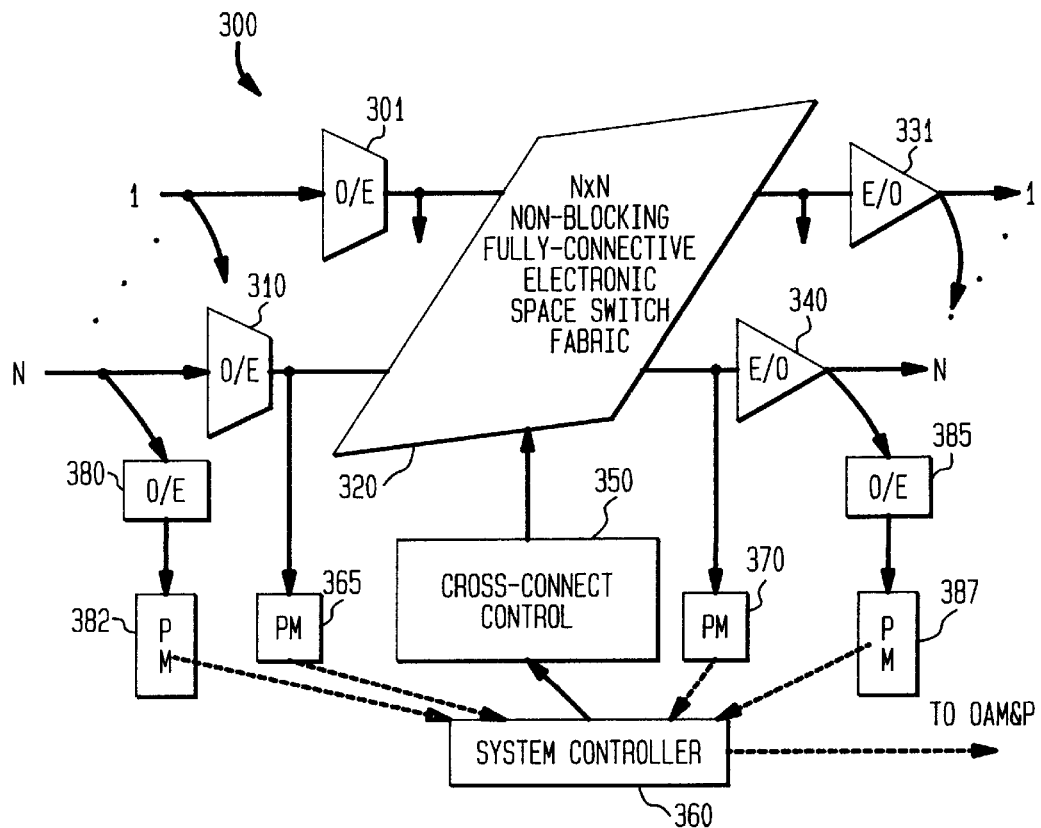
FIG. 3 is an exemplary embodiment of a cross-connecting optical translator array with system performance monitoring in accordance with the present invention.

FIG. 3 illustrates an exemplary embodiment of a cross-connecting optical translator array 300, which includes various system performance monitoring. Cross-connecting optical translator array 300 includes N broadband optical-to-electrical converters 301–310 that are coupled to corresponding input ports of a N×N non-blocking, fully connective electronic space switch fabric 320. Optical transmitters 331–340 are coupled to the output ports of electronic space switch fabric 320. A cross-connect controller 350 is coupled to electronic space switch fabric 320 for controlling the connectivity between the input and output ports.

A system controller 360 is coupled to controller 350 for supervising the operations of controller 350, for controlling the traffic to and from array 300 and for monitoring the performance of electronic space switch fabric 320. System controller 360 samples bits after the optical signals have been converted by converters 301–310 and at the output of electronic space switch fabric 320. This data is obtained by performance monitors 365 and 370, respectively, which in turn forwards the data to system controller 360. Optical cross-connect switches do not permit access to bits and as a consequence performance monitoring cannot be performed on a bit level. However, the present invention provides access to the bits since the actual switching is achieved using an electronic space switch fabric. In general, performance monitors facilitate fault localization. As such, if monitoring is desired prior to entering the receivers and after exiting the transmitters, additional optical-to-electrical converters 380 and 385 can be situated prior to entering converters 301–310 and after optical transmitters 331–340, which feed performance monitors 382 and 387, respectively. Performance monitors 382 and 387 then feed the data to system controller 360. System controller 360 communicates with an Operations, Administration, Maintenance and Provisioning ("OAM&P") system, which can be, for example, a centralized intelligence system.

Figure 4:
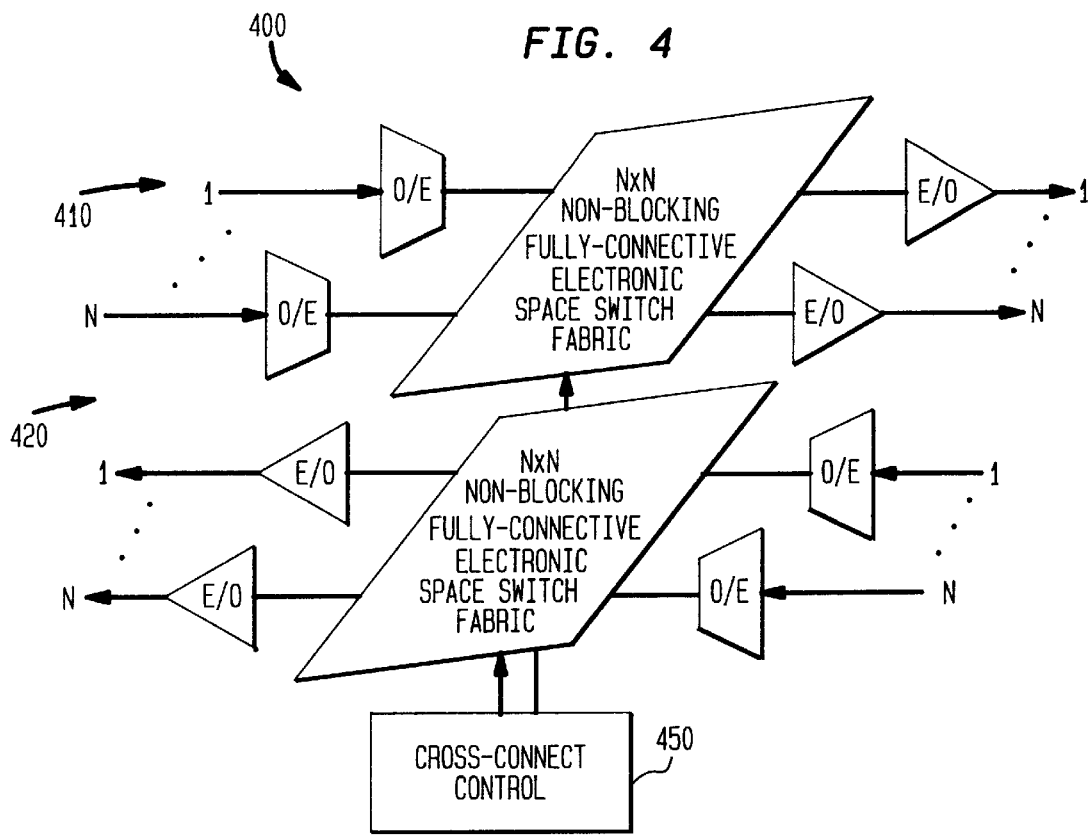
FIG. 4 is an exemplary embodiment of a cross-connecting optical translator array in a partitioned arrangement in accordance with the present invention.

FIG. 4 illustrates an exemplary embodiment of a cross-connecting optical translator array 400 in a partitioned arrangement. Under certain conditions it is possible to partition the functionality such that the switch fabric separates into two smaller switch fabrics that can use the same control map. This is only possible when full connectivity is not required. For example, in a partitioned arrangement, it is not possible to feed an input signal back in the original direction. FIG. 4 illustrates the architecture implementable when partitioning is available. In this architecture, array 400 includes a first array 410 in a first direction and a second array 420 in a second direction. Array 410 and array 420 are implemented as explained herein. A cross-connect controller 450 is used to map the connectivity between the inputs and outputs of both array 410 and 420. Partitioning results in a less complex design and a more manageable system.

Figure 5:
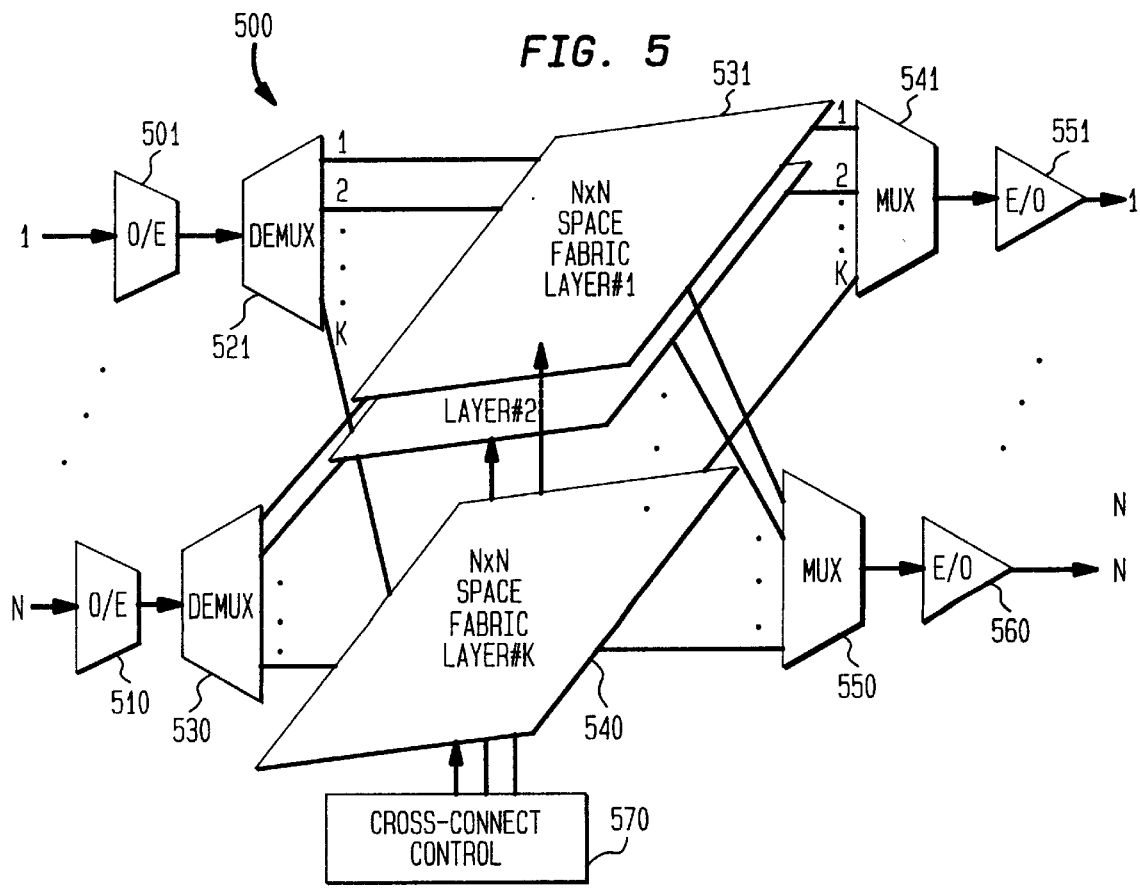
FIG. 5 is an exemplary embodiment of a cross-connecting optical translator array with multiple layers in accordance with the present invention.

FIG. 5 illustrates an exemplary embodiment of a cross-connecting optical translator array 500 that can process higher bit rate optical signals using lower bit rate electronic space switch fabrics. Cross-connecting optical translator array 500 includes N broadband optical-to-electrical converters 501–510 that are coupled to N modulo K bit dis-interleavers 521–530, where K represents the factor by which the original bit rate is reduced. Bit dis-interleavers 521–530 can be implemented for example, with Time Division Multiplexing demultiplexers. The demultiplexed electrical signals are coupled to the corresponding input ports of one of K N×N non-blocking, fully connective electronic space switch fabric layers 531–540. Bit interleavers 541–550 are coupled to output ports of one of electronic space switch fabric layers 531–540. Bit interleavers 541–550 can be implemented for example, with Time Division Multiplexing multiplexers. Bit interleavers 541–550 multiplex the signals back to the higher bit rate and forward the electrical signals to optical transmitters 551–560. A cross-connect controller 570 is coupled to electronic space switch fabric layers 531–540 for controlling the connectivity between the input and output ports. Note that byte level dis-interleavers and interleavers can be implemented in accordance with the present invention.

For example, assume that each electronic space switch fabric layer operates at 1.25 Gb/s. If the bit rate of the optical signals are 2.5 Gb/s, which corresponds to an Optical Carrier level 48, then K=2. A first layer would process the odd bits and a second layer would process the even bits. If the higher bit rate is 10 Gb/s, which corresponds to an Optical Carrier level 192, then K=8. In this instance, the first layer would process bits 1, 9, 17 etc., the second layer would process bits 2, 10, 18, etc., and so on.

In an alternative embodiment, since both bit dis-interleavers and interleavers may be physically co-located, an additional (independent) N×N switch layer (i.e., a K+1 layer) may be added to the above architecture to facilitate the timing and synchronization between the dis-interleaver and interleaver functions. A further embodiment may use additional layers as protection layers to allow for a fault tolerant design.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A cross-connecting optical translator array, comprising:
    N optical converters for converting optical signals, received at at least one input wavelength, to electrical signals;
    an electronic space switch fabric coupled to said N optical converters for cross-connecting said electrical signals from an input side to an output side, said electronic space switch fabric including K space fabric layers, ones thereof being operative to process portions of an input signal to at least one of said N optical converters at a lower bit rate than a bit rate for said input signal, wherein K represents a factor by which said K space fabric layer bit rate is reduced from said input signal bit rate;
    modulo K dis-interleavers, one dis-interleaver coupled to a corresponding one of said N optical converters and outputs of each of said dis-interleavers coupled to inputs of each of said K space fabric layers;
    modulo K interleavers coupled to outputs of each of said K space fabric layers;
    an input of one of said N optical transmitters being coupled to an output of one of said modulo K interleavers; and
    N optical transmitters for transmitting optical signals at at least one output wavelength in response to output electrical signals received from said electronic space switch fabric.

2. The array according to claim 1, wherein said at least one input wavelength and said at least one output wavelength are identical.

3. The array according to claim 1, wherein said at least one input wavelength and said at least one output wavelength are different.

4. The array according to claim 1, further comprising a cross-connect controller coupled to said electronic space switch fabric for controlling a connectivity map between said input side and said output side of said electronic space switch fabric.

5. The array according to claim 4, wherein a system controller is coupled to said cross-connect controller for supervising the operations of said cross-connect controller, for controlling traffic and for monitoring the performance of said array.

6. The array according to claim 5, wherein performance monitors are coupled to an output of said N optical converters and to an input of said N optical transmitters, said performance monitors feeding said system controller.

7. The array according to claim 6, further including:
    a first supplementary set of N optical converters for transmitting electrical signals to a corresponding performance monitor;
    a second supplementary set of N optical converters coupled to an output of said N optical transmitters for transmitting electrical signals to a corresponding performance monitor;
    each said corresponding performance monitor feeding said system controller.

8. The array according to claim 1, further including an additional space fabric layer for facilitating timing and synchronization between each said modulo K interleaver and each said modulo K dis-interleaver.

9. The array according to claim 1, further including at least one additional space fabric layer for providing a fault tolerant capability in said electronic space switch fabric.

10. The array according to claim 4, wherein said cross-connect controller is coupled to each layer of said electronic space switch fabric.

11. The array according to claim 1, wherein said at least one input wavelength and at least another input wavelength are identical.

12. The array according to claim 1, wherein said at least one input wavelength and at least another input wavelength are different.

13. The array according to claim 1, wherein said at least one output wavelength and at least another output wavelength are identical.

14. The array according to claim 1, wherein said at least one output wavelength and at least another output wavelength are different.

15. A method for electronically switching optical signals, said method comprising the steps of:
    converting optical signals, received at at least one input wavelength, to electrical signals with N optical converters;
    cross-connecting said electrical signals from an input side to an output side of an electronic space switch fabric, said electronic space switch fabric including K space fabric layers, ones thereof being operative to process portions of an input signal to one of said N optical converters at a lower bit rate than a bit rate for said input signal, and wherein K represents a factor by which said K space fabric layer bit rate is reduced from said input signal bit rate;
    demultiplexing said electrical signals with modulo K dis-interleavers that are coupled to a corresponding output of one of said N optical converters and further coupled to inputs of each of said K space fabric layers;
    multiplexing output electrical signals with a modulo K interleaver that is coupled to outputs of each of said K space fabric layers and is further coupled to an input of one of said N optical transmitters and
    transmitting optical signals at at least one output wavelength with N optical transmitters in response to output electrical signals received from said electronic space switch fabric.

16. The method according to claim 15, wherein said at least one input wavelength and said at least one output wavelength are identical.

17. The method according to claim 15, wherein said at least one input wavelength and said at least one output wavelength are different.

18. The method according to claim 15, further including the step of controlling a connectivity map between said input side and said output side of said electronic space switch fabric.

19. The method according to claim 18, further including the steps of supervising the operations of said cross-connect controller, controlling traffic in said electronic space switch fabric and for monitoring the performance of said electronic space switch fabric.

20. The method according to claim 19, wherein said step of monitoring the performance includes sampling data at an output of said N optical converters and an input of said N optical transmitters.

21. The method according to claim 15, further including the step of transmitting said electrical signals and said output electrical signals to a corresponding performance monitor.

22. The method according to claim 15, wherein said at least one input wavelength and at least another input wavelength are identical.

23. The method according to claim 15, wherein said at least one input wavelength and at least another input wavelength are different.

24. The method according to claim 15, wherein said at least one output wavelength and at least another output wavelength are identical.

25. The method according to claim 15, wherein said at least one output wavelength and at least another output wavelength are different.

* * * * *